United States Patent [19]

Pey

[11] 4,083,190

[45] Apr. 11, 1978

[54] FUNDAMENTAL ARMOR MODULE IN BREAKWATER NET LINKED SYSTEM

[76] Inventor: Raul Pey, Casilla 2374, Santa Cruz, Bolivia

[21] Appl. No.: 684,484

[22] Filed: May 10, 1976

[51] Int. Cl.² .............................................. E02B 3/06
[52] U.S. Cl. .................................... 61/4; 52/608; 46/25; 61/37; 404/41
[58] Field of Search ............ 61/4, 5, 3, 1 R, 37, 61/38; 52/608, 609, DIG. 2; 404/36, 37, 38, 40, 41; 46/25

[56] References Cited

U.S. PATENT DOCUMENTS

| 2,909,037 | 10/1959 | Palmir | 61/4 |
| 3,176,468 | 4/1965 | Nagai et al. | 61/4 |
| 3,368,357 | 2/1968 | Takamori | 61/3 |

*Primary Examiner*—Paul R. Gilliam
*Assistant Examiner*—A. Grosz

[57] ABSTRACT

A breakwater composed of a network of interconnected elements of similar size and configuration, each of which has a body with a through axial recess and vertically projecting portions so that when the bodies are arranged in levels, the portions interlink in the recesses forming a network of bodies which are adapted to be assembled at a job site as a breakwater to resist wave action.

6 Claims, 9 Drawing Figures

FUNDAMENTAL ARMOR MODULE IN BREAKWATER NET LINKED SYSTEM

FIELD OF THE INVENTION

This invention relates to breakwaters, and, more particularly, to elements sized and configured for mating interlinking connection with one another to define a multi-level network comprising a breakwater.

BACKGROUND OF THE INVENTION

As is perhaps well known, it is quite often desired to have a breakwater at various locations, and this invention is of an improved construction of bodies of similar size and configuration for interlinking to define a multi-level or layered network or breakwater wherein each of the bodies includes a generally triangular configuration having a plurality of equi-spaced legs extending from the vertexes to interlink in mating relation with corresponding bodies provided with similar legs, the legs being received in recesses provided in the bodies.

It is a general object of this invention to provide an improved breakwater network and bodies therefor which form the network when interlinked, which is composed of similarly sized members which may be prefabricated in concrete or other rigid material and transported to a job site to be interconnected with one another to form a breakwater network which is effective and relatively effective to resist wave action and relatively inexpensive in construction and to assemble.

In accordance with these and other objects which will become apparent hereinafter, the instant invention will now be described with reference to the accompanying drawings in which:

DESCRIPTION OF PREFERRED EMBODIMENT

Figure 1:
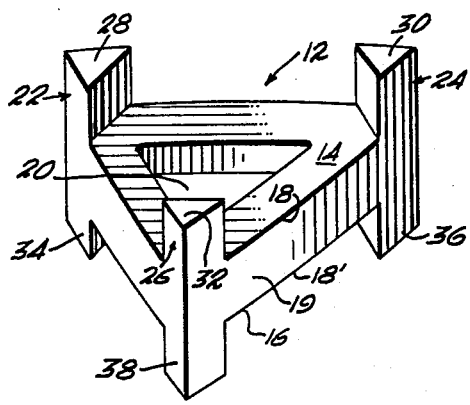
FIG. 1 is a perspective view of an element for use in forming a support layer of a network of elements to form a breakwater according to the instant invention.

Referring to the drawings, wherein like reference characters designate like or corresponding parts throughout the several views and referring particularly to FIG. 1, there is shown an element generally designated by the numeral 12 which includes a first upper surface 14 and a second or lower surface 16 with each surface having a peripheral edge 18 and 18' on opposite sides of a side surface of the element body, which side surface is generally designated by the numeral 19. Each element has a central cylindrical through recess 20 which has an axis perpendicular to the surfaces and which recess is of a predetermined cross sectional area which is generally triangular in configuration of equiangular form.

Figure 2:
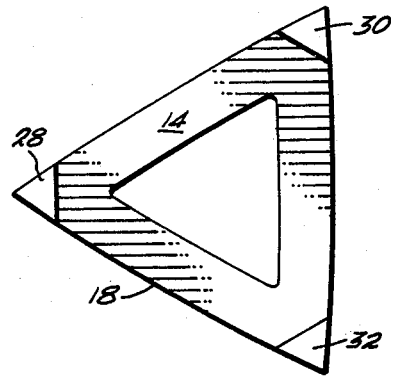
FIG. 2 is a top plan view of the element shown in FIG. 1.

As shown, the element of FIGS. 1 and 2 are generally triangular as seen in plan, and symmetrical with respect to a vertical plane, that is, a plane bisecting the vertex of one of the angles. It is seen that, from the upper surface 14 of the element, there is a plurality of three equispaced arms 22, 24 and 26 which are integral with the element; and each extends a common distance from the surface 14 at one of the vertexes of the elements, see FIG. 2. Each arm is triangular as seen in cross section. Each of the arms is integral at its proximal end with the element or body and the arms extend to a distal end and are generally triangular in cross section, see 28, 30 and 32. The cross sectional area of each of the arms is less than one-third the area of the through recess 20 and the arms are preferably of a length between their ends which is about equal to the distance between the surfaces 14 and 16 of the body, i.e., the depth of the recess. The body also has a plurality of three equispaced legs, 34, 36 and 38 integral therewith and extending a common distance from the second surface 16 adjacent the peripheral edge thereof at each of the vertexes. Each of the legs is also cylindrical and triangular in cross section and the distal end is spaced from its proximal end a distance about equal to that of the legs extending from the other surface 14. Each of these legs is of a cross sectional area less than one-third the area of the through recess and defines an equiangular triangle as seen in cross section.

Figure 3:
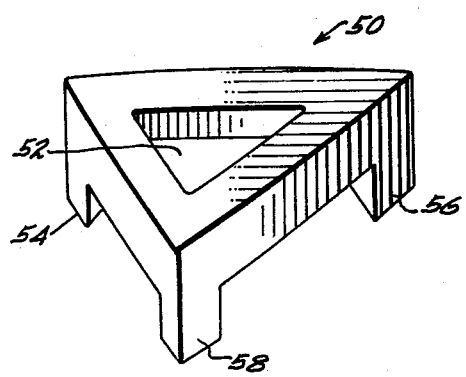
FIG. 3 is a view of an element for use in forming a top layer of a network of elements to interlink with a lower layer of elements similar to those of FIG. 1 to form a breakwater according to the instant invention.

Referring now to FIG. 3, a second type body is shown which is designated by the numeral 50. It is similarly sized for mating engagement with bodies such as that shown in FIG. 1 with the legs extending from one surface only. It also is provided with a central through recess 52 which is equiangular and generally about congruent to the recess 20. The body 50 has a plurality of three equispaced legs 54, 56 and 58 each having a terminal end zone which, as seen in plan, defines an equiangular triangle in the preferred embodiment.

Figure 4:
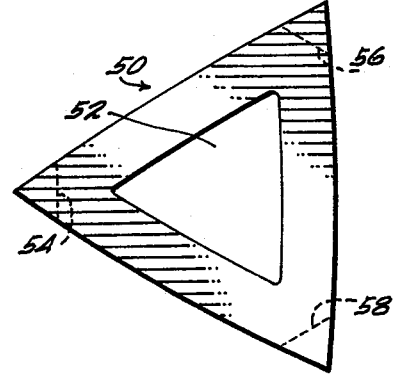
FIG. 4 is a top plan view of the element shown in FIG. 3.
Figure 7:
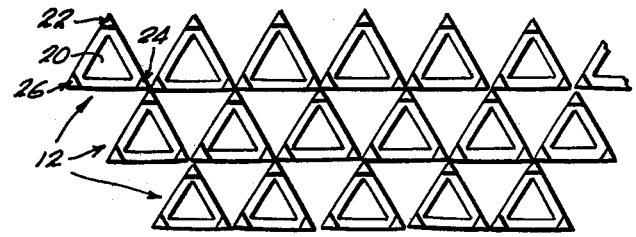
FIG. 7 is a view of a support level of elements, similar to those of FIG. 1, which are arranged in a network.
Figure 8:
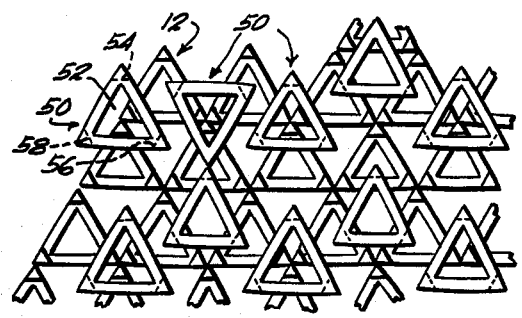
FIG. 8 is a view similar to FIG. 7 and illustrating the first or support level of elements and a second or top level of elements arranged in a network with the elements interlinked and forming a submerged breakwater.
Figure 9:
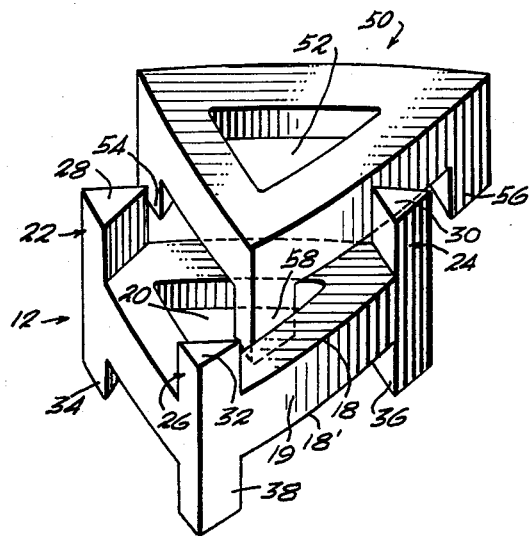
FIG. 9 is an exploded perspective view of interlinked or interconnected elements of the support layer type and the top layer type of elements, as shown in FIGS. 1 and 3, respectively.

With reference to FIG. 7, the utilization of the elements is shown forming a lower or support layer of a network comprising a breakwater. A plurality of bodies as seen in FIG. 1 are arranged as shown on a surface; that is, with all of the bodies oriented similarly with their respective legs extending from one surface and supporting the elements with their arms extending upwardly. With reference to FIG. 8 it is seen that the bodies similar to those shown in FIGS. 3 and 4 are positioned over the bodies of the lower or support level forming an upper or top level above the level shown in FIG. 7; that is, with their respective legs being recessed in the recesses of the lower level. It is seen in FIG. 8 that the downwardly-extending legs of the body shown in FIG. 3 are received within the recesses of the lower level bodies, mating with them and forming an interconnected network. This is more apparent upon reference to FIG. 9, comprising a perspective view and illustrating an interconnected pair of bodies of an upper level and a lower level.

Figure 5:
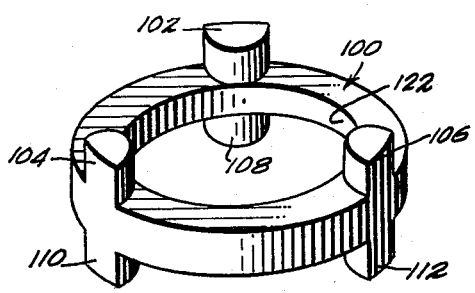
FIGS. 5 and 6 are alternative embodiments of the elements shown in FIG. 1.
Figure 6:
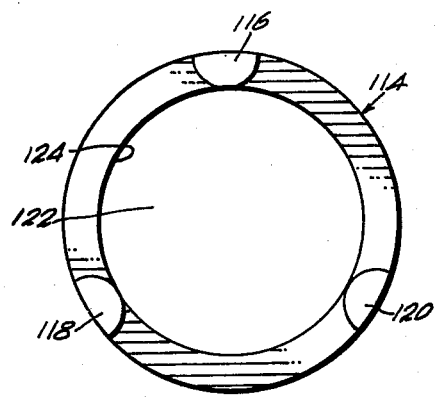

With reference to FIGS. 5 and 6, an alternative embodiment is shown wherein the body as seen in plan is generally circular and wherein the legs as seen in plan are generally semicircular, the bodies in FIG. 5 being designated by the numeral 100 with the upwardly extending legs being designated by the numerals 102, 104 and 106 and the downwardly extending legs being designated by the numerals 108, 110 and 112 and the corresponding body is designated by the numeral 114 with the legs extending from one of the surfaces being designated 116, 118 and 120. Once again, the legs are sized for receipt within the cylindrical recesses 122 and 124 when the bodies are arranged in levels with their legs in confronting relation similar to that described with reference to FIGS. 7 and 8.

It is thus seen that there is provided a plurality of bodies adapted to be interconnected in a network to define a breakwater. For example, the bodies can be formed of reinforced concrete or steel or other heavy material. The bodies are of two types for standardization of construction; each are relatively small. However, when interconnected at a job site into a network as seen in FIGS. 7 and 8 they comprise a sturdy, heavy, interlinked breakwater network composed of members with interlocked legs which rest on the surface on legs and with the central recesses and with the network with its central recesses and interlinked legs forming a cellular type structure to absorb the kinetic energy of wave action with the levels being adjustable to allow for soil for changes in the support surface by reason of the clearance provided, it being noted that the cross-sectional area of the recesses is greater than three times the cross-sectional area of the legs. There is thus provided meshing units to be interlinked to define the breakwater network or breakwater which may be several levels high if desired.

What is claimed is:

1. A network for use in a breakwater, said network as seen in plan having a central zone bounded by an outer zone and said network comprising a plurality of adjacent bodies in a support layer and a plurality of adjacent bodies in a supported layer, all of the bodies of said support layer being at a lower level and all of the bodies of said supported level being at an upper level, said levels being generally parallel and closely adjacent to one another and means keying said upper and lower levels together forming a breakwater network, each body of said support layer and each body of said supported layer being of a common size as seen in plan, and each of said bodies of each of said layers having an upper face and a lower face, said faces of each body being bounded at their respective peripheral edges by a side surface, and each body having a cylindrical through recess perpendicular to the faces and of a first predetermined cross sectional area and configuration, said recesses extending centrally between the faces, said faces of each body of said layers being symmetrical as seen in plan with respect to a vertical center plane perpendicular to the faces, the upper face of each of the bodies of said support layer in the central zone confronting the lower faces of the bodies of the supported layer in the central zone, a plurality of three equispaced legs integral with each of the bodies of said supported layer, each leg extending a common distance from the respective lower faces of their respective associated bodies and being adjacent the peripheral edge, each of the legs of said supported layer having a proximal end and a distal end and being of a cross sectional area less than one-third the cross sectional area of said through recess and of a length between said ends extending from said lower face of the bodies of said supported layer a distance equal to the distance between the faces of said bodies through said recess, and each leg of the bodies of the supported layer extending between adjacent bodies of the support layer, a plurality of three equispaced arms integral with each of the bodies of the support layer, each arm extending a common distance from the respective upper face of their associated respective body and being adjacent the peripheral edge, each of said arms of said support layer having a proximal end and a distal end and being of a cross sectional area less than one-third the area of said through recess of the bodies of the supported layer and of a length between said ends extending from said upper face of the body of said support layer a distance equal to the distance between the faces of said body through said recess, and each arm of the bodies of the support layer extending into a recess of one of the bodies of the supported layer in the central zone, and the cross sectional area of said arms of the bodies of the support layer and the bodies about the recesses of the supported layer and, also, the legs of the supported layer about the faces of the bodies of the support layer comprising said keying means to loosely interconnect the bodies and layers and in combination defining a breakwater network, and support means extending from the lower face of the supported layer to engage a support surface.

2. The device as set forth in claim 1 wherein the faces of said bodies are generally triangular as seen in plan.

3. The device as set forth in claim 1 wherein the faces of the bodies are generally circular as seen in plan.

4. The device as set forth in claim 1 wherein the support means comprise a plurality of projections downwardly extending from the lower faces of the bodies of the support layer.

5. A plurality of bodies for interconnection into an upper layer and a lower layer to define an underwater breakwater network wherein each of the bodies of the network includes an upper face and a lower face, said faces being bounded at their respective peripheral edges by a side surface and each body having a cylindrical through recess perpendicular to the faces and of a first predetermined cross sectional area in configuration, said recesses extending centrally between the faces, a plurality of three equispaced legs integral with each of said bodies, each leg extending a common distance from the lower face of its associated body and being adjacent the peripheral edge thereof, each leg having a proximal end and a distal end and being of a cross sectional area less than one-third of the area of said recess and of a length between said ends extending from said lower face of the associated body a distance equal to the distance between the faces of said body through said recess, and said legs and the bodies about said recesses, comprising key means for loosely interconnecting the bodies in said upper layer and said lower layer and each of said recesses being adapted to receive three legs of adjacent bodies in an adjacent layer.

6. The plurality of bodies as set forth in claim 5 wherein some of the bodies include a plurality of three equispaced arms integral with the body and each arm extending a common distance from the upper face of the body and being adjacent to the peripheral edge, each of said arms having a proximal end and a distal end and being of a cross sectional area less than one-third the area of said through recess and of a length between said ends extending from said upper face of the body a distance equal to the distance between the faces of said body through said recess and each arm being adapted to extend into the recess of an adjacent body recess, and some of said bodies comprising a supported layer when interconnected in a network defining an underwater breakwater.

* * * * *